US010248605B2

(12) United States Patent
Pearson et al.

(10) Patent No.: US 10,248,605 B2
(45) Date of Patent: Apr. 2, 2019

(54) BIDIRECTIONAL LANE ROUTING

(71) Applicant: Hewlett-Packard Development Company, L.P., Houston, TX (US)

(72) Inventors: Roger A. Pearson, Fort Collins, CO (US); Shane Ward, Windsor, CO (US); Raphael Gay, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/543,200

(22) PCT Filed: Jan. 28, 2015

(86) PCT No.: PCT/US2015/013246
§ 371 (c)(1),
(2) Date: Jul. 12, 2017

(87) PCT Pub. No.: WO2016/122480
PCT Pub. Date: Aug. 4, 2016

(65) Prior Publication Data
US 2017/0371823 A1 Dec. 28, 2017

(51) Int. Cl.
*G06F 13/40* (2006.01)
*G06F 13/42* (2006.01)
(52) U.S. Cl.
CPC ........ *G06F 13/409* (2013.01); *G06F 13/4282* (2013.01)
(58) Field of Classification Search
CPC .................................... G06F 13/4282
USPC .......................................... 710/31
See application file for complete search history.

(56) References Cited

U.S. PATENT DOCUMENTS

| | | | | |
|---|---|---|---|---|
| 5,572,688 A | * | 11/1996 | Sytwu | G06F 13/4027 710/100 |
| 5,659,781 A | | 8/1997 | Larson | |
| 5,911,049 A | * | 6/1999 | Watanabe | H04N 1/00236 710/100 |
| 6,004,139 A | * | 12/1999 | Dramstad | H01R 31/06 361/760 |

(Continued)

FOREIGN PATENT DOCUMENTS

| | | |
|---|---|---|
| JP | 2000-259510 A | 9/2000 |
| JP | 2001-177208 A | 6/2001 |

OTHER PUBLICATIONS

PCI Express Base Specification Revision 3.0 Nov. 10, 2010 (Year: 2010).*

(Continued)

*Primary Examiner* — Paul R. Myers
(74) *Attorney, Agent, or Firm* — Tarolli, Sundheim Covell & Tummino

(57) ABSTRACT

An apparatus includes a pass-through module that includes connector pins to connect with at least one active motherboard connector and to separately connect with at least one routing motherboard connector. A routing function on the pass-through module redirects a set of bidirectional lanes from the connector pins connected to the active motherboard connector to the connector pins connected to the routing motherboard connector to enable a connection of the set of bidirectional lanes to at least one other motherboard connector via the routing motherboard connector.

12 Claims, 7 Drawing Sheets

(56) References Cited

U.S. PATENT DOCUMENTS

| | | | | |
|---|---|---|---|---|
| 6,356,966 | B1* | 3/2002 | Loach | G06F 13/409 439/78 |
| 6,985,152 | B2* | 1/2006 | Rubinstein | G06F 3/14 345/502 |
| 7,077,679 | B1* | 7/2006 | Szuba | G06F 1/185 439/327 |
| 7,246,190 | B2* | 7/2007 | Nguyen | G06F 13/405 370/402 |
| 7,293,125 | B2 | 11/2007 | McAfee et al. | |
| 7,447,825 | B2* | 11/2008 | Chen | G06F 13/4081 710/301 |
| 7,539,801 | B2* | 5/2009 | Xie | G06F 13/4221 710/104 |
| 7,562,174 | B2* | 7/2009 | Danilak | G06F 3/14 710/305 |
| 7,600,112 | B2 | 10/2009 | Khatri et al. | |
| 7,640,383 | B2* | 12/2009 | Tseng | G06F 13/4022 710/104 |
| 7,793,029 | B1* | 9/2010 | Parson | G06F 13/385 710/301 |
| 8,103,993 | B2* | 1/2012 | Atherton | G06F 13/4022 716/100 |
| 8,271,715 | B2 | 9/2012 | Yap et al. | |
| 8,433,839 | B2* | 4/2013 | Sun | H05K 1/029 710/301 |
| 8,601,196 | B2* | 12/2013 | Sun | G06F 13/409 710/104 |
| 8,898,362 | B2* | 11/2014 | Sun | G06F 13/4063 361/792 |
| 2003/0007338 | A1* | 1/2003 | Brosowski | H05K 1/142 361/785 |
| 2006/0012390 | A1* | 1/2006 | Tsai | G01R 31/2863 324/750.05 |
| 2007/0139426 | A1 | 6/2007 | Kong et al. | |
| 2007/0223263 | A1 | 9/2007 | Erdmann | |
| 2010/0315135 | A1* | 12/2010 | Lai | G06F 5/06 327/145 |
| 2011/0043989 | A1* | 2/2011 | Tien | G06F 1/184 361/679.4 |
| 2012/0144096 | A1* | 6/2012 | Schuette | G06F 3/061 711/103 |
| 2012/0260015 | A1 | 10/2012 | Gay et al. | |

OTHER PUBLICATIONS

PCI Express M.2 Specification Revision 1.0 Nov. 1, 2013 (Year: 2013).*

Steve Moore, "Using Nextgen PCI Express Swicthes to Eliminate Network I/O Bottlenecks", May 15, 2008, pp. 1-8, PLX Technology.

* cited by examiner

BIDIRECTIONAL LANE ROUTING

BACKGROUND

A motherboard, also known as the mainboard or system board, is the main printed circuit board (PCB) found in computers and other expandable systems. It holds many of the electronic components of the system, such as the central processing unit (CPU) and memory, and provides connectors for other peripherals. Unlike a backplane, a motherboard includes significant sub-system electronics such as the processor and other components. In addition to the CPU and memory, the motherboard may include a PCB with expansion capabilities, such as includes sound cards, video cards, network cards, hard drives, or other forms of storage, TV tuner cards, cards providing extra USB or FireWire slots and a variety of other custom components. To provide expansion capability for such cards, one or more expansion buses having expansion connectors are provided with the motherboard. For many users, however, more functionality is often needed from the motherboard expansion buses than usually available from the manufacturer.

DETAILED DESCRIPTION

This disclosure relates to a pass-through module having a routing function to route bidirectional lanes between connectors to facilitate functional reconfiguration of a motherboard. This is achieved by enabling connector functions of an unused connector to be directed to one or more other motherboard connectors via the routing function. An unused connector (or connectors) referred to as a routing connector on a motherboard can be employed to route bidirectional lanes of an expansion bus from an active connector on the motherboard to another motherboard connector (e.g., enable functional reconfiguration of the motherboard (e.g., enable expansion board slots to be reconfigured for different serial communications capability). A pass-through module is provided that includes connector pins (e.g., electrically conductive contacts on one or more sides of an edge connector) to connect electrically with at least one active motherboard connector (e.g., a slotted connector) and to separately connect electrically with the routing motherboard connector (e.g., a slotted connector). A routing function on the pass-through module redirects a set of bidirectional lanes from the connector terminals connected to the active motherboard connector to the connector terminals connected to the routing motherboard connector. This enables a connection of the set of bidirectional lanes to at least one other motherboard connector via the routing motherboard connector.

The bidirectional lanes can be serial input and output communications lanes of a Peripheral Component Interconnect Express (PCIe) bus, for example. The active connector and the routing connector can each be implemented according to the M.2 standard, such as to include a prescribed arrangement of contacts on both sides of an edge connector, for example. Thus in one example, the pass-through module can route bidirectional lanes from an active M.2 connector to an inactive M.2 connector which is also connected to a PCIe connector. Such routing between connectors provides additional lanes to the PCIe connector through the routing connector which increases the serial communications functionality of the PCIe connector.

Figure 1:
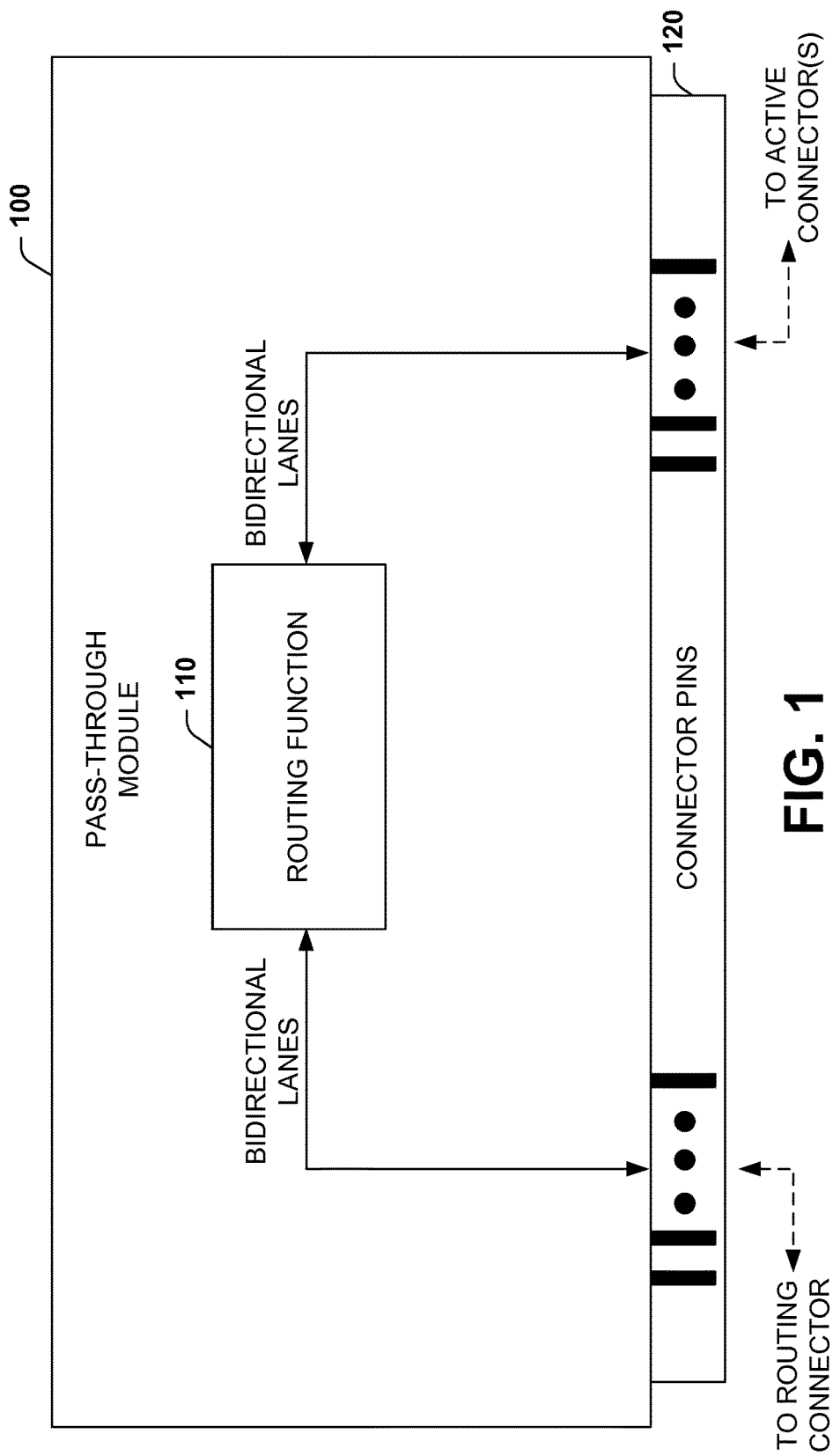
FIG. 1 illustrates an example of an apparatus that includes a pass-through module having a routing function to facilitate functional reconfiguration of a motherboard.

FIG. 1 illustrates an example of an apparatus that includes a pass-through module 100 having a routing function 110 to facilitate functional reconfiguration of a motherboard. The pass-through module includes connector pins 120 to connect with at least one active motherboard connector and to separately connect with at least one routing motherboard connector. As used herein, the term active connector refers to a connector electrically wired to provide a motherboard connection to a module that connects to the active connector to functionally interact with the motherboard computer. The term routing connector refers to an unused connector that does not connect a module to the motherboard nor provide functional interaction with the motherboard. The routing connector is employed to connect one or more signals from the routing connector to another connector on the motherboard.

The routing function 110 on the pass-through module 100 redirects a set of bidirectional lanes from the connector pins 120 connected to the active motherboard connector (not shown) (See e.g., FIGS. 2-5) to the connector pins connected to the routing motherboard connector (not shown) to enable a connection of the set of bidirectional lanes to at least one other motherboard connector via the routing motherboard connector. In one example, the bidirectional lanes are serial input and output communications lanes of a Peripheral Component Interconnect Express (PCIe) bus. As used herein, a lane may include two differential signaling pairs, such as one pair for receiving data and the other for transmitting data. In some examples, each lane may include four wires or signal traces (e.g., a full-duplex byte stream) for transporting multi-bit data packets concurrently in both directions between endpoints of a given link (e.g., including multiple lanes).

The PCIe bus is a high-speed serial replacement of older PCI/PCI-X bus. One of the differences between the PCIe bus and the older PCI is the bus topology; PCI uses a shared parallel bus architecture, in which the PCI host and all devices share a common set of address, data and control lines. In contrast, PCIe is based on point-to-point topology, with separate serial data links connecting every device to the root complex (host). Due to its shared bus topology, access to the older PCI bus is arbitrated (in the case of multiple masters), and limited to one master at a time, in a single direction. The PCIe bus link supports full-duplex communication between any two endpoints, with no inherent limitation on concurrent access across multiple endpoints.

The PCIe link between two devices can include from one to 32 bidirectional communications lanes, for example. In a multi-lane link, the packet data is striped across lanes, and peak data throughput scales with the overall link width. The lane count is automatically negotiated during device initialization, and can be restricted by either endpoint. For example, a single-lane PCIe (×1) card can be inserted into a multi-lane slot (×4, ×8, and so forth), and the initialization cycle auto-negotiates the highest mutually supported lane count. The link can dynamically down-configure itself to use fewer lanes, providing a failure tolerance in case bad or unreliable lanes are present. The PCI Express standard defines slots and connectors for multiple widths: ×1, ×4, ×8, ×12, ×16 and ×32, for example.

In some examples, the active connector and the routing connector described herein can be a M.2 connector. The M.2 connector, formerly known as the Next Generation Form Factor (NGFF), is a specification for internally mounted computer expansion cards and associated connectors. Computer bus interfaces provided through the M.2 connector, together with supported logical interfaces, are a superset to those defined by the SATA Express interface. Essentially, the M.2 standard is a small form factor implementation of the SATA Express interface (which provides support for PCI Express 3.0 and Serial ATA 3.0), with the addition of other interfaces like the USB 3.0 interface. The M.2 connector can have different keying notches that denote various uses of M.2 modules and various interfaces.

The routing function 110 can include electrical traces to redirect a set of bidirectional lanes. The routing function 110 further can include a PCIe switch, a redriver, a clock buffer, and/or a retimer to route and/or boost a lane and/or associated clock signal (See e.g., FIG. 7). The pass-through module connector pins 120 can include an install pin (See. e.g., FIG. 3) to notify a motherboard controller that the pass-through module is installed and to enable the motherboard controller to reapportion the set of bidirectional lanes to the other motherboard connector via the routing connector.

With respect to PCIe bus examples, there are a fixed number of PCIe links (e.g., four bidirectional lanes to a link) in any given computer system and often system designers must make difficult choices and trade-offs when allocating these valuable resources. The pass-through module 100 and routing function 110 disclosed herein allows PCIe lanes to be reallocated and/or redirected, thus allowing maximum design flexibility and system expandability while minimizing base system costs. In a particular example, the pass-through module 100 can plugs into a M.2 slot. This includes the routing function 110 having electrical traces, and in some cases additional components (e.g., PCIe end-point buffers, drivers, clock chips, and so forth) that allows PCIe interface signals to be redirected to another device or connector such as a PCIe connector.

The PCIe bus provides a high-speed interface that is used to connect peripheral devices to a host computer system. A computer system that supports PCIe has one or more PCIe links and each of these links can connect a single peripheral device to the system. In some circumstances, this means a system designer would be required route a PCIe link to a single embedded device or connector thus dedicating it to only that single embedded device, add-in adapters, or cables that are supported by the specific connector type used. The pass-through module 100 provides design flexibility and end-user configurability by allowing a PCIe link to be redirected to a different connector or device without burdening every system with additional cost. This allows for flexible system design, expandability, and end-user configurability while minimizing base system cost.

Figure 2:
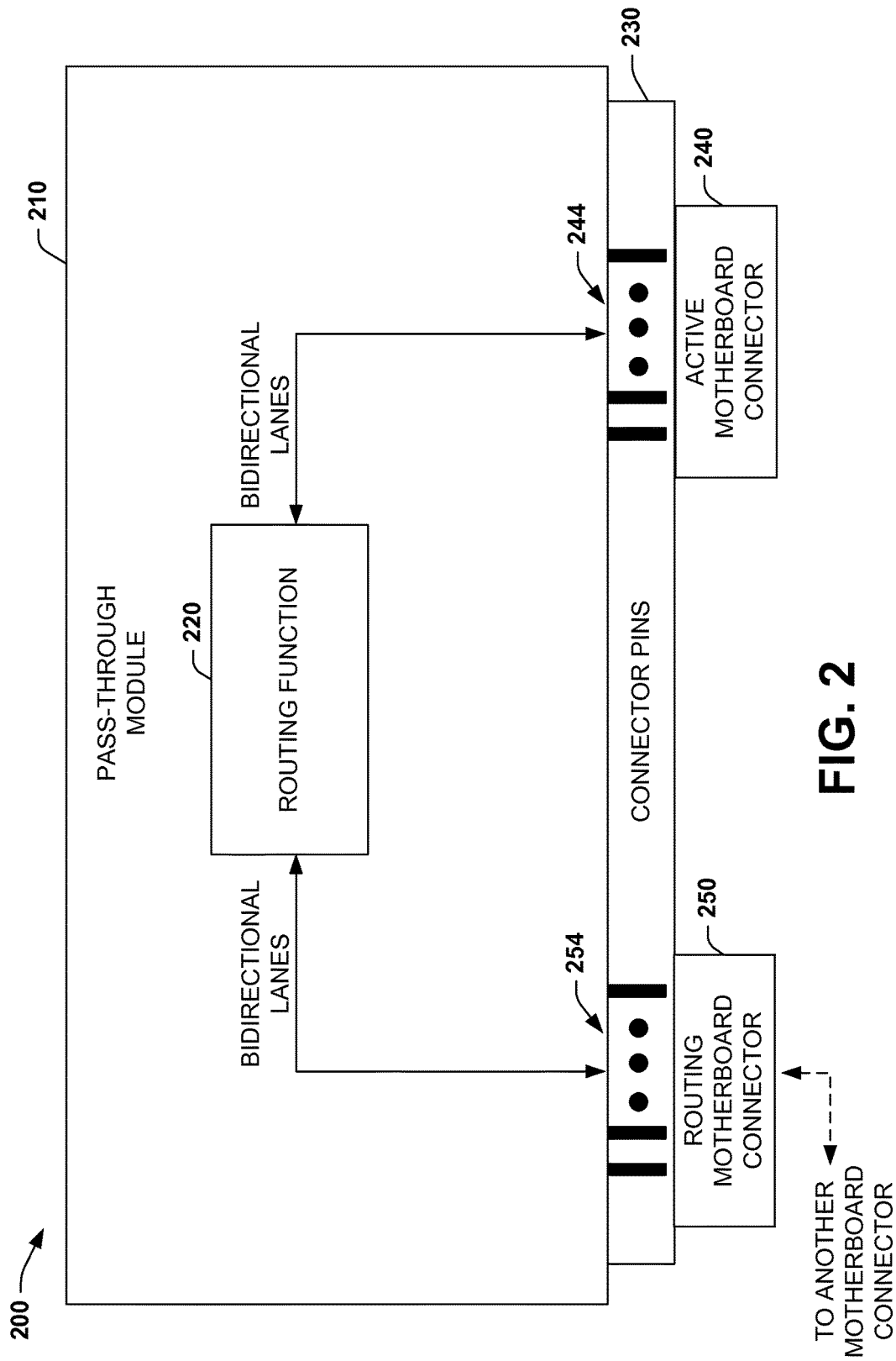
FIG. 2 illustrates an example of a system that includes a pass-through module having a routing function to route bidirectional lanes between connectors to facilitate functional reconfiguration of a motherboard.

FIG. 2 illustrates an example of a system 200 that includes a pass-through module 210 having a routing function 220 to route bidirectional lanes between connectors to facilitate functional reconfiguration of a motherboard. The system 200 includes the pass-through module 210 that includes connector pins 230. At least one active motherboard connector 240 connects with a first set of the connector pins 244 of the pass-through module 210. At least one routing motherboard connector 250 connects with a second set of the connector pins 254 of the pass-through module 210. The routing function 220 on the pass-through module 210 redirects a set of bidirectional lanes from the first set of connector pins 244 connected to the active motherboard connector 244 to the second set of connector pins 254 connected to the routing motherboard connector 254. This routing enables a connection of the set of bidirectional lanes to at least one other motherboard connector (See e.g., FIG. 3) via the routing motherboard connector 250.

As noted previously, the bidirectional lanes can be serial input and output communications lanes of a Peripheral Component Interconnect Express (PCIe) bus. The other motherboard connector described herein can be a Peripheral Component Interconnect Express (PCIe) connector, for example. The active connector 240 and the routing connector 250 can be an M.2 connector (or two standard PCIe edge connectors laid out end-to-end), for example. The routing function 220 includes electrical traces to redirect a set of bidirectional lanes and at least one buffer to drive the set of bidirectional lanes and/or to drive a clock signal associated with the bidirectional lanes.

The pass-through module connector pins 230 can include an install pin (See e.g., FIG. 3) to notify a motherboard controller that the pass-through module 210 is installed and to enable the motherboard controller to reapportion the set of bidirectional lanes to the other motherboard connector. By way of example, reapportioning includes combining or bifurcating lanes assignments between resources. If a root port assignment were initially assigned as a ×4 to the motherboard connector and a ×4 to the active connector when the pass-through module was not installed by the controller, then when the pass-through module was installed, all eight lanes could be apportioned as a ×8 assignment to the motherboard connector, for example (See apportioning examples in FIGS. 4 and 5 and described below)

Figure 3:
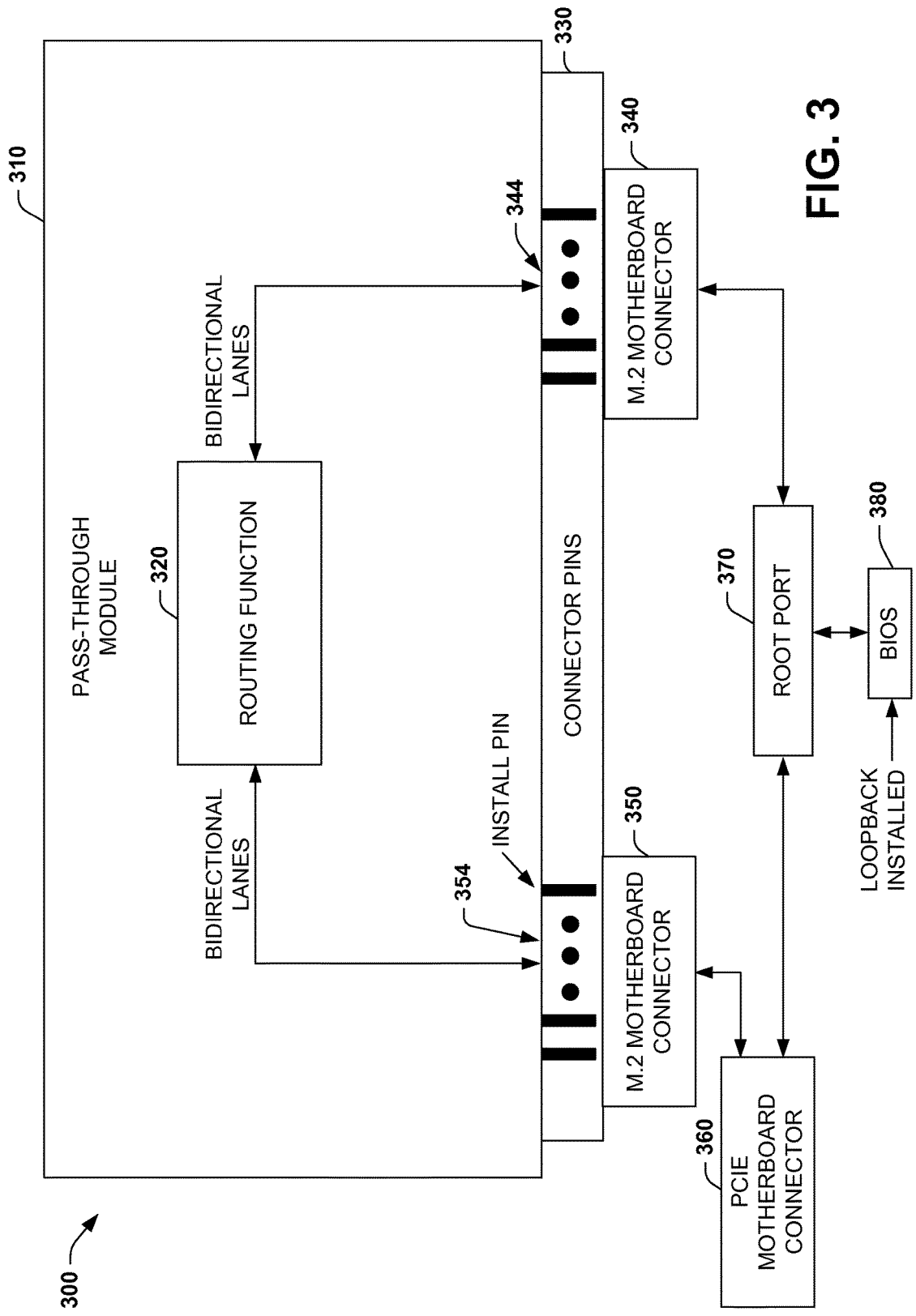
FIG. 3 illustrates an example of a system that includes motherboard components that operate with a pass-through module having a routing function to route bidirectional lanes between connectors to facilitate functional reconfiguration of a motherboard.

FIG. 3 illustrates an example of a system 300 that includes motherboard components that operate with a pass-through module 310 having a routing function 320 to route bidirectional lanes between connectors to facilitate functional reconfiguration of a motherboard. The system 300 includes the pass-through module 310 that includes an arrangement of connector pins 330 (e.g., edge connectors along one or more sides of a card). In this example, the at least one active M.2 motherboard connector 340 connects with a first set of the connector pins 344 of the pass-through module 310. At least one routing M.2 motherboard connector 350 connects with a second set of the connector pins 354 of the pass-through module 310. A Peripheral Component Interconnect Express (PCIe) motherboard connector 360 is connected to the routing connector. For example, the connection electrically connects pins to connect respective lanes together (e.g., lane one connected to lane one, lane two connected to lane two, clock 1 connected to clock 1, and so forth).

The routing function 320 on the pass-through module 310 redirects a first set of bidirectional lanes from the first set of connector pins 344 connected to the active M.2 motherboard connector 340 to the second set of connector pins 354 connected to the routing M.2 motherboard connector 350. This routing enables a connection of the first set of bidirectional lanes to the PCIe motherboard connector 360 via the routing M.2 motherboard connector 350.

A root port 370 configures (e.g., apportions lanes between different resources) the first set of bidirectional lanes for the active motherboard connector 340 and configures a second set of bidirectional lanes for the PCIe connector 360. A basic input output system (BIOS) 380 operating as a motherboard controller notifies the root port how to apportion a base set of bidirectional lanes from the root port between the first set of bidirectional lanes and the second set of bidirectional lanes (See e.g., FIGS. 4 and 5). As shown, the pass-through module 310 includes an installation pin to notify the BIOS 380 that the pass-through module is installed. When notified, the BIOS 380 can instruct the root port to reapportion the bidirectional lanes. For example, instead of two ×4 apportionments—one ×4 to the M.2 connector 340 and one ×4 to the PCIE connector, when the pass-through module 310 is installed, all eight lanes can be apportioned to the PCIE connector 360 as a respective ×8 lane configuration.

Figure 4:
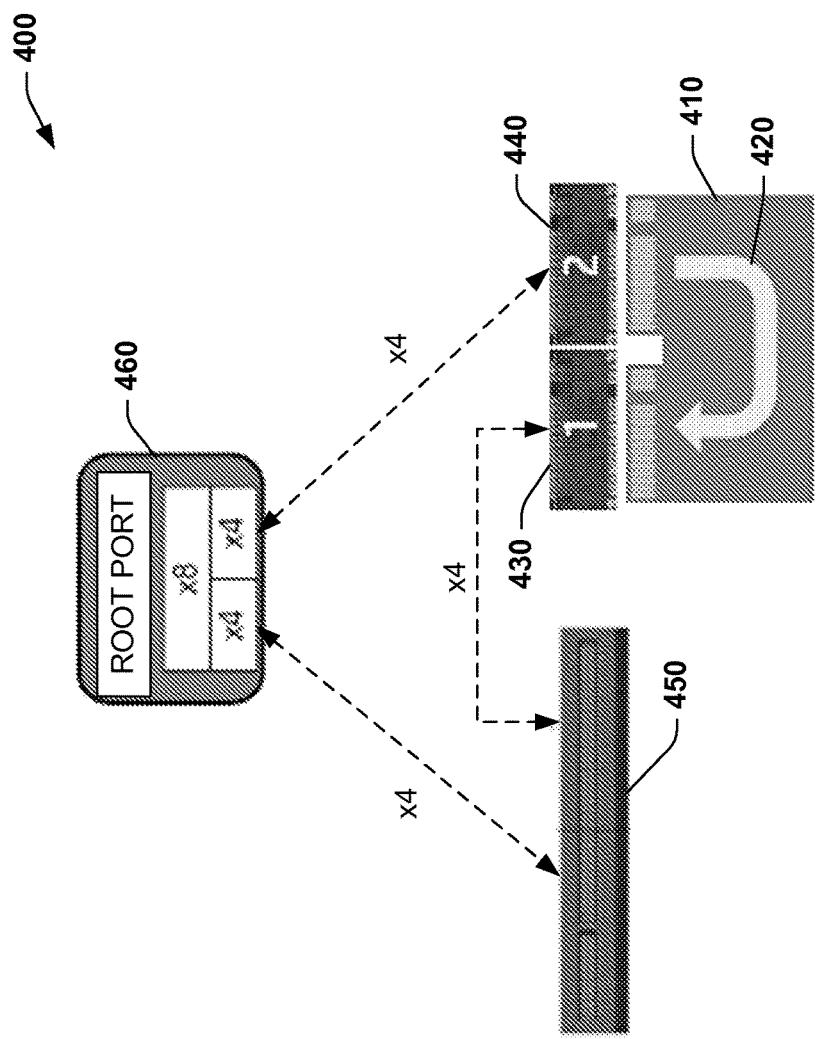
FIG. 4 illustrates an example of a two-connector routing system that includes a pass-through module having a routing function to route bidirectional lanes between connectors to facilitate functional reconfiguration of a motherboard.

FIG. 4 illustrates an example of a two-connector routing system 400 that includes a pass-through module 410 having a routing function 420 to route bidirectional lanes between connectors to facilitate functional reconfiguration of a motherboard. The system 400 includes a routing M.2 connector 430 and an active M.2 connector 440, where the routing function 410 routes bidirectional lanes from the active connector through the routing connector to a PCIe connector 450. If the pass-through module 410 is detected (e.g., by the motherboard in response to the install pin), a root port 460 apportions all bidirectional lanes as a ×8 connection in this example. If the pass-through module 410 is not detected (e.g., by the motherboard failing to sense the install pin), the root port 460 apportions a ×4 configuration to the active connector 440 and a separate ×4 configuration to the PCIe connector 450.

Figure 5:
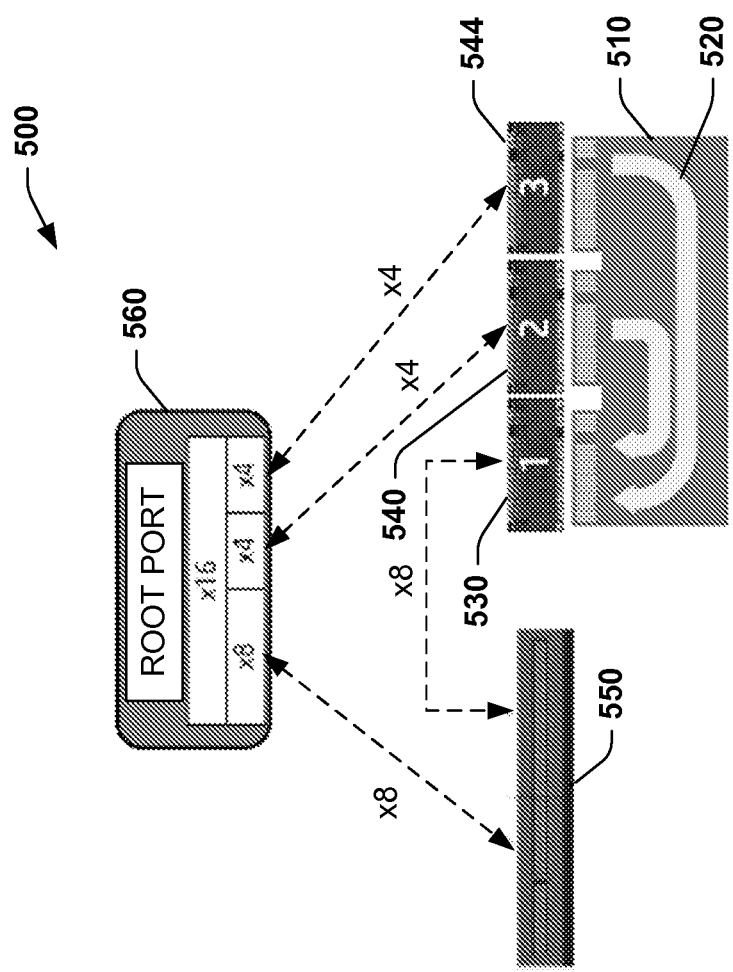
FIG. 5 illustrates an example of a three-connector routing system that includes a pass-through module having a routing function to route bidirectional lanes between connectors to facilitate functional reconfiguration of a motherboard.

FIG. 5 illustrates an example of a three-connector routing system 500 that includes a pass-through module 510 having a routing function 520 to route bidirectional lanes between connectors to facilitate functional reconfiguration of a motherboard. The system 500 includes a routing M.2 connector 530 and two active M.2 connectors 540 and 544, where the routing function 510 routes bidirectional lanes to a PCIe connector 550 from each of the active connectors through the routing connector. If the pass-through module 510 is detected (e.g., by the motherboard in response to the install pin), a root port 560 apportions all bidirectional lanes as a ×16 connection in this example. If the pass-through module 510 is not detected, the root port 560 apportions a ×4 configuration to the active connector 540, a ×4 configuration to the active connector 544, and a separate ×8 configuration to the PCIe connector 550.

Figure 6:
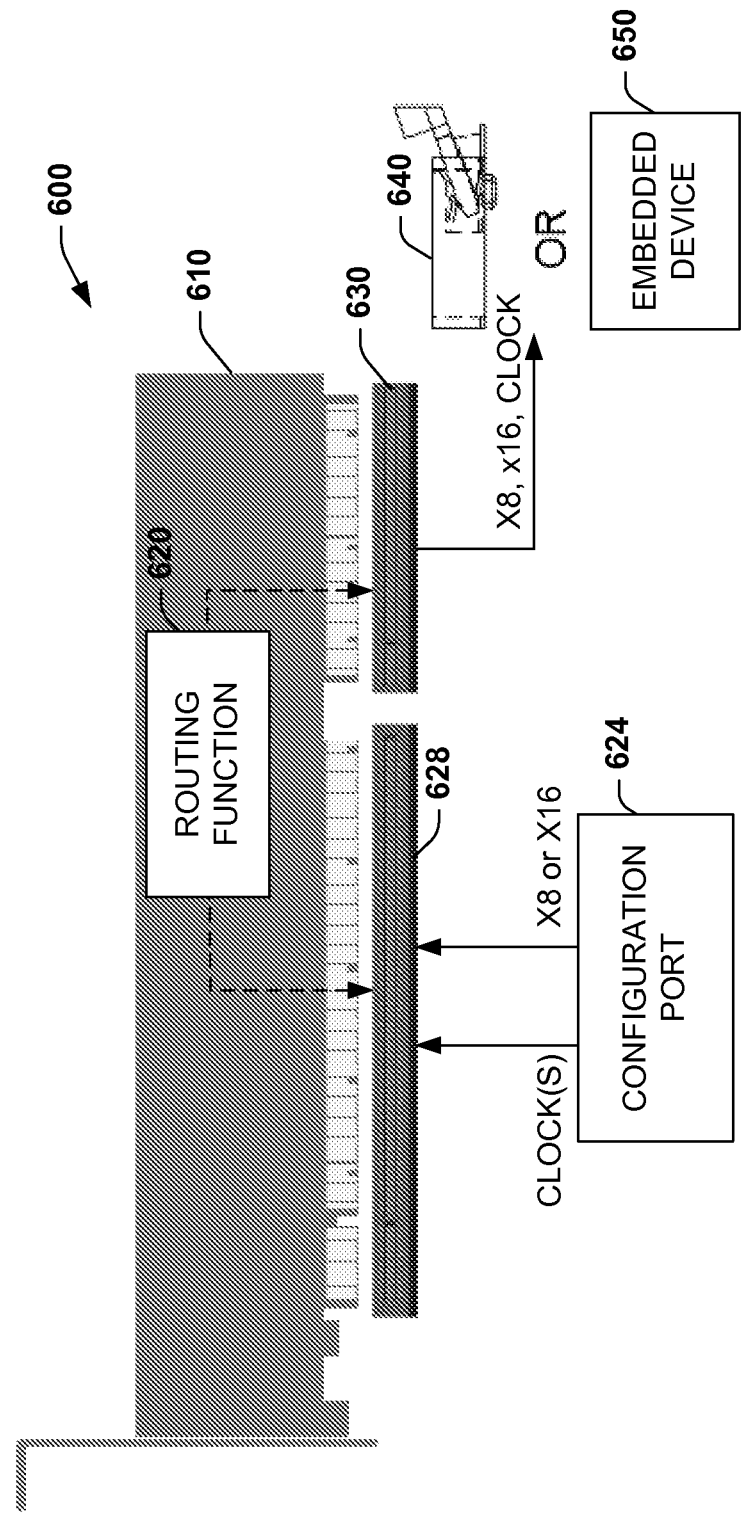
FIG. 6 illustrates an alternative example of a two-connector routing system that includes a pass-through module having a routing function to route bidirectional lanes.

FIG. 6 illustrates an alternative example of a two-connector routing system 600 that includes a pass-through module 610 having a routing function 620 to route bidirectional lanes. The system 600 includes a configuration port 624 to provide bidirectional lanes and a clock (or clocks) to a PCIE connector 628. In this example, the configuration port 624 can provide a ×8 or a ×16 configuration depending on the lane resources to be routed to other resources via the routing function 620. The configuration port 624 can be a PCIe root port or a processor flex I/O port for example. The pass-through module 610 routes the clock and bidirectional lanes to another PCIe connector 630 as a set of lanes and clocks. In this example, lanes can be routed as ×1's, ×2's, ×4's, ×8's, ×12's, ×16's, or ×32's, for example. The connector 630 can be connected to another connector 640 (e.g., M.2 connector) or an embedded device 650.

Figure 7:
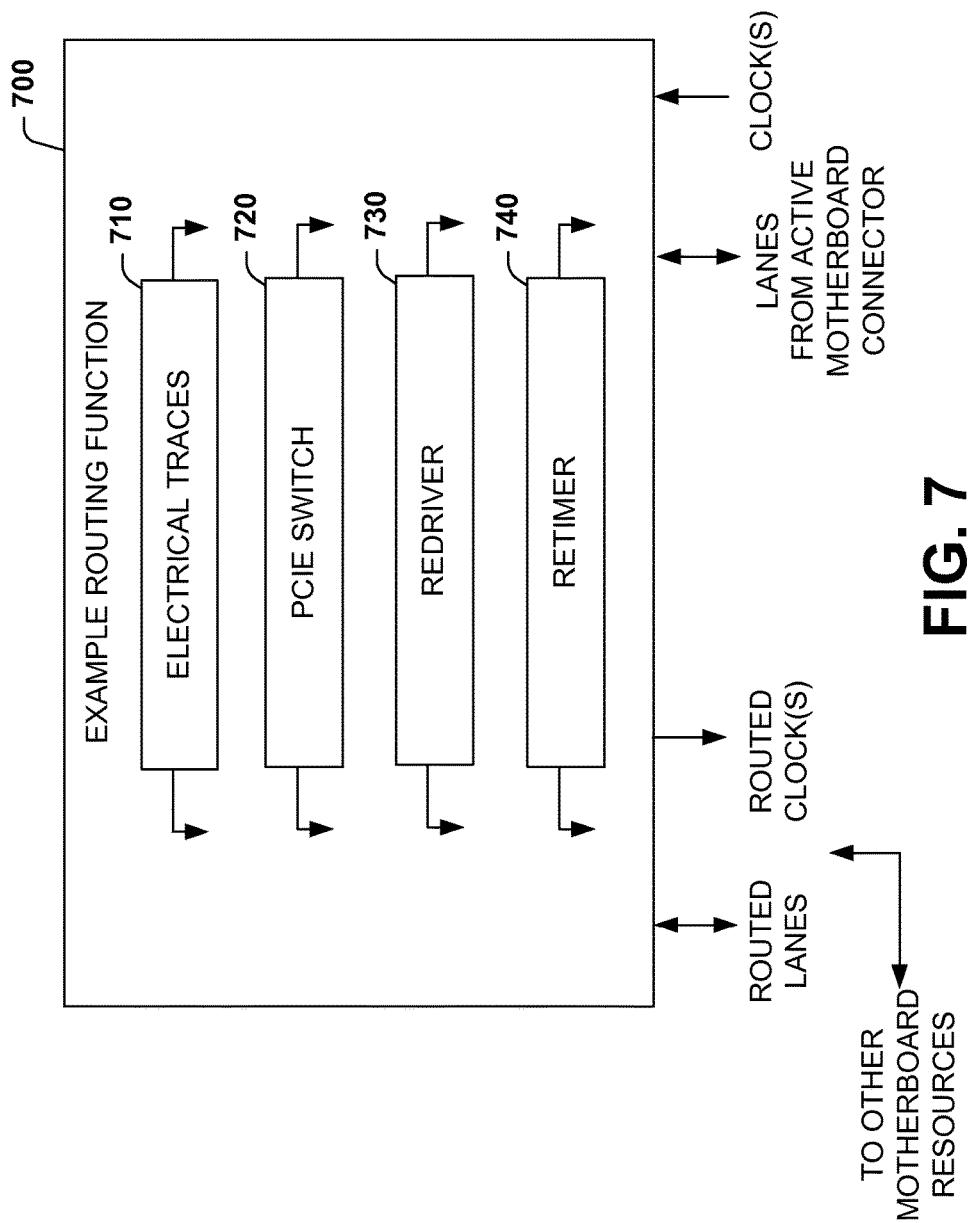
FIG. 7 illustrates an example a routing function to facilitate functional reconfiguration of a motherboard.

FIG. 7 illustrates an example routing function 700 to facilitate functional reconfiguration of a motherboard. The routing function 700 can include various components to interface with lanes and/or clock signals from an active motherboard connector which route lanes and/or clock signals to other motherboard resources as described herein (e.g., other connectors or devices). In one example, the routing function 700 can include electrical traces 710 to provide lane and/or clock routing. The routing function 700 can include a PCIe switch 720 (also referred to as a bridge) to provide routing. In some examples, one routing connection can support one device on each endpoint of each connection. The PCIe switch 720 can create multiple downstream links out of one upstream link, for example, for example. The routing function 700 can also include a redriver 730 (or redrivers). The redriver 730 (also referred to as repeaters) can be employed to provide a signal boosting function to the lanes and/or clock signals described herein. The routing function 700 can also include a retimer 740 (or retimers). Retimers 740 facilitate routing of clock information and can capture training information, where training information refers to the number of lanes in a set (e.g., ×1, ×4, ×8, ×16, ×32). This includes automatically configuring each segment of a link.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An apparatus, comprising:
   a pass-through module that includes connector pins to connect with at least one active motherboard connector and to separately connect with at least one routing motherboard connector; and
   a routing function on the pass-through module to redirect a set of bidirectional lanes from the connector pins connected to the at least one active motherboard connector to the connector pins connected to the at least one routing motherboard connector to enable a connection of the set of bidirectional lanes to at least one other motherboard connector via the at least one routing motherboard connector,
   wherein the pass-through module connector pins include an install pin to notify a motherboard controller that the pass-through module is installed and to enable the motherboard controller to reapportion the set of bidirectional lanes to the at least one other motherboard connector.

2. The apparatus of claim 1, wherein the bidirectional lanes are serial input and output communications lanes of a Peripheral Component Interconnect Express (PCIe) bus.

3. The apparatus of claim 1, wherein the at least one active connector and the at least one routing connector are configured according to the M.2 standard or the PCIe standard.

4. The apparatus of claim 1, wherein the routing function includes an electrical trace to redirect the set of bidirectional lanes from an active motherboard connector to at least one other motherboard resource.

5. The apparatus of claim 1, wherein the routing function includes a PCIe switch, a redriver, a clock buffer, or a retimer to drive the set of bidirectional lanes or a clock signal associated with the set of bidirectional lanes from an active motherboard connector to at least one other motherboard resource.

6. A system, comprising:
a pass-through module that includes connector pins;
at least one active motherboard connector to connect with a first set of the connector pins of the pass-through module;
at least one routing motherboard connector to connect with a second set of the connector pins of the pass-through module; and
a routing function on the pass-through module to redirect a set of bidirectional lanes from the first set of connector pins connected to the at least one active motherboard connector to the second set of connector pins connected to the at least one routing motherboard connector to enable a connection of the set of bidirectional lanes to at least one other motherboard connector via the at least one routing motherboard connector,
wherein the pass-through module connector pins include an install pin to notify a motherboard controller that the pass-through module is installed and to enable the motherboard controller to reapportion the set of bidirectional lanes to the at least one other motherboard connector.

7. The system of claim 6, wherein the bidirectional lanes are serial input and output communications lanes of a Peripheral Component Interconnect Express (PCIe) bus.

8. The system of claim 7, wherein the at least one other motherboard connector is a Peripheral Component Interconnect Express (PCIe) connector.

9. The system of claim 6, wherein the at least one active connector and the at least one routing connector are an M.2 connector or a PCIe connector.

10. The system of claim 6, wherein the routing function comprises:
an electrical trace to redirect a set of bidirectional lanes; and
a PCIe switch, a redriver, a clock buffer, or a retimer to drive the set of bidirectional lanes or a clock signal associated with the set of bidirectional lanes from an active motherboard connector to at least one other motherboard resource.

11. The system of claim 6, further comprising a root port to configure the first set of bidirectional lanes for the at least one active motherboard connector and to configure a second set of bidirectional lanes for the at least one other connector.

12. A system, comprising:
a pass-through module that includes connector pins;
at least one active M.2 motherboard connector to connect with a first set of the connector pins of the pass-through module;
at least one routing M.2 motherboard connector to connect with a second set of the connector pins of the pass-through module;
a Peripheral Component Interconnect Express (PCIe) motherboard connector connected to the routing connector;
a routing function on the pass-through module to redirect a first set of bidirectional lanes from the first set of connector pins connected to the at least one active M.2 motherboard connector to the second set of connector pins connected to the at least one routing M.2 motherboard connector to enable a connection of the first set of bidirectional lanes to the PCIe motherboard connector via the at least one routing M.2 motherboard connector;
a root port to configure the first set of bidirectional lanes for the at least one active motherboard connector and to configure a second set of bidirectional lanes for the PCIe connector; and
a basic input output system (BIOS) to instruct the root port how to apportion a base set of bidirectional lanes from the root port between the first set of bidirectional lanes and the second set of bidirectional lanes,
wherein the pass-through module includes an installation pin to notify the BIOS that the pass-through module is installed and to enable the BIOS to reapportion the first set of bidirectional lanes to the PCIe motherboard connector.

* * * * *